(12) United States Patent
Bostancioglu et al.

(10) Patent No.: US 10,218,519 B1
(45) Date of Patent: Feb. 26, 2019

(54) SYSTEM AND METHOD FOR DETERMINING WHETHER USERS SHOULD BE PROVIDED ACCESS TO ONLINE CONTENT

(71) Applicant: Udemy, Inc., San Francisco, CA (US)

(72) Inventors: Burak Bostancioglu, San Francisco, CA (US); Aleksander Bekker, San Francisco, CA (US); Çagdas Tülek, San Carlos, CA (US); Jared Lang, Petaluma, CA (US); Allison Ann Carlisle, Pacifica, CA (US); Russell Jon Larner, San Francisco, CA (US)

(73) Assignee: Udemy, Inc., San Francisco, CA (US)

( * ) Notice: Subject to any disclaimer, the term of this patent is extended or adjusted under 35 U.S.C. 154(b) by 138 days.

(21) Appl. No.: 15/476,865

(22) Filed: Mar. 31, 2017

(51) Int. Cl.
H04L 29/06 (2006.01)
H04L 9/32 (2006.01)
G06F 21/31 (2013.01)

(52) U.S. Cl.
CPC ............ *H04L 9/3297* (2013.01); *G06F 21/31* (2013.01); *H04L 63/102* (2013.01); *G06F 2221/2151* (2013.01)

(58) Field of Classification Search
CPC ............................ H04L 63/102; H04L 9/3297
See application file for complete search history.

(56) References Cited

U.S. PATENT DOCUMENTS

| | | | |
|---|---|---|---|
| 9,712,427 B1 * | 7/2017 | Pittman | ............... H04L 67/1097 |
| 2006/0123133 A1 | 6/2006 | Hrastar | |
| 2010/0192201 A1 | 7/2010 | Shimoni | |
| 2016/0241579 A1 | 8/2016 | Roosenraad | |

* cited by examiner

*Primary Examiner* — Dao Q Ho
(74) *Attorney, Agent, or Firm* — McDermott Will & Emery LLP (57) ABSTRACT

Systems and methods for identifying whether users should be provided access to online content. Request information related to user requests for content may be obtained. A record indicating whether or not requesting user accounts should be provided access to the online content may be maintained. Whether the requesting user accounts should be provided access to individual pieces of content requested may be determined based on the record. A log may be updated with the request information related to the user requests for content. The request information included in the log may be analyzed to identify one or more of the requesting user accounts that are currently provided access to the online content, but should not be provided access to the online content in the future. The record may be updated based on the analysis of the request information included in the log.

21 Claims, 3 Drawing Sheets

SYSTEM AND METHOD FOR DETERMINING WHETHER USERS SHOULD BE PROVIDED ACCESS TO ONLINE CONTENT

FIELD OF THE INVENTION

The disclosure relates to systems and methods for determining whether users should be provided access to online content.

BACKGROUND OF THE INVENTION

Online content marketplaces may offer various types of online content to users. For example, documents, text, photos and/or graphical content, audio content, and/or video content may be offered for purchase. The content may and/or may not be downloadable by the users. When users are not permitted to download the content, preventing such unauthorized downloads may be managed via DRM (Digital Rights Management). However, DRM suffers from various drawbacks, including but not limited to, failing to prevent unauthorized use of the online content, imposing undesired restrictions on authorized use of the content, violating privacy rights of users, and/or other drawbacks.

SUMMARY

The disclosure herein relates to system for identifying whether users should be provided access to online content. The present application describes a system that may be used to identify and/or prevent unauthorized and/or anomalous use of online content (e.g., downloading content a user only has permission to stream, etc.). The system may be used by content providers (e.g., online education platforms, online content marketplaces, etc.) to limit access to the online content they host and/or offer for sale. Generally, when online content is distributed via a Content Delivery Network (CDN), the content provider has to rely on the CDN to authenticate the user requests for content (e.g., typically via token authentication, and/or other DRM). According to one non-limiting example, the system may enable content providers and/or hosts to authenticate user requests for content via a Content Delivery Network (CDN), rather than the authentication being and/or not being determined by the CDN and the content providers being left out of the loop.

The present system may obtain request information related to user requests for content. The request information may be stored in a log that may be dynamically updated as the users requests for online content are received. The system may maintain a record indicating whether or not requesting user accounts should be provided access to the online content. For example, the record may include one or more user accounts that should and/or should not be provided access to the online content. For individual ones of the requests for content received, the system may determine whether the request user accounts should be provided access to individual pieces of content requested based on the record.

The system may analyze the log to identify one or more requesting users accounts that are currently provided access to the online content but should not be provided access to the online content in the future. By way of non-limiting example, the analysis of the log may identify anomalies within the request information. The analysis of the log may be performed dynamically according to individual requesting users and/or time intervals. The record may be updated based on the analysis of the log. The analysis of the log and/or updating the record may be performed dynamically and/or according to time intervals. As such, responsive to receiving user requests for content, whether or not requesting user accounts should be provided access to the content requested may be determined based on an updated record of users that should and/or should not be provided access to the online content. They system may be used to identify and/or prevent unauthorized use of the online content automatically, quickly, and/or efficiently.

A system for identifying whether users should be provided access to online content may include one or more server(s) and/or one or more client computing platforms. The server(s) and the client computing platform(s) may communicate in a client/server configuration, server/server configuration, and/or other configuration. The server(s) may include one or more processors configured by machine-readable instructions to execute computer program components. The computer program components may include one or more of: a request component, a record component, an access component, a log component, and/or other components.

The request component may be configured to obtain request information related to the user requests for content. The user requests for content may be requests for individual pieces (e.g., segment(s), portion(s), part(s), etc.) of online content. For example, the user requests for content may be requests for individual pieces of online and/or digital video content, audio content (e.g., audio recordings, podcasts, etc.), image content (e.g., images, infographics, presentation slides, etc.), documents (e.g., text files, PDFs, ebooks, etc.), and/or other online and/or digital content. The request information related to an individual request may include one or more of an account identifier of a requesting user account, a content identifier that identifies a piece of content being requested, temporal information indicating a time of the individual request, and/or other information related to the individual request. First request information related to a first user request for a first piece of content may be obtained. The first request information may include a first account identifier, a first content identifier that identifies the first piece of content, first temporal information indicating a first time of the first user request, and or other information related to the first user request.

The record component may be configured to maintain a record indicating whether or not requesting user accounts should be provided access to the online content. The record may include information (e.g., account identifiers, and/or other information) identifying one or more of the requesting user accounts that should and/or should not be provided access to the online content.

The access component may be configured to determine whether the requesting user accounts should be provided access to the individual pieces of content requested. Such determinations may be based on the record. A determination that the first user account should be provided access to the first piece of content may be made based on the record. Responsive to a determination that the requesting user accounts should be provided access to the individual pieces of content being requested, access component may approve the user requests for content and/or provide access to the individual pieces of content requested. Responsive to a determination that the requesting user accounts should not be provided access to the individual pieces of content requested, the access component may deny the user requests for content and/or may not provide access to the individual pieces of content requested.

The log component may be configured to update a log with the request information related to the user requests for content. The log may be updated to include the first request information related to the first user request for the first piece of content.

The log component may be configured to analyze the request information included in the log to identify one or more of the requesting user accounts that should not be provided access to the online content in the future. The request information in the log related to the user requests for content made by the first user account may be analyzed. The request information included in the log may be analyzed to identify one or more of the requesting user accounts that are currently provided access to the online content but should not be provided access to the online content in the future. The request information may be analyzed according to individual ones of the requesting users such that analyzing the request information included in the log includes analyzing the request information that is related to the user requests for content made by individual ones of the requesting users. The first user account may be identified as one of the requesting user accounts that should not be provided access to the online content in the future.

The log component may be configured to update the record to indicate one or more user accounts should and/or should not be provided access to the online content. In some implementations, the record may be updated to indicate the first user account should not be provided access to the online content based on the analysis of the request information in the log.

The request component may be configured to obtain second request information related to a second user request for a second piece of content made by the first user account. The second request information may include one or more of a first account identifier, a second content identifier that identifies the second piece of content, second temporal information indicating a second time of the second user request, and/or other information related to the second request for online content.

The access component may be configured to determine whether the first user account should be provided access to the second piece of content based on the record. The access component may determine that the first user account should not be provided access to the second piece of content being requested based on the record (e.g., the updated record).

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
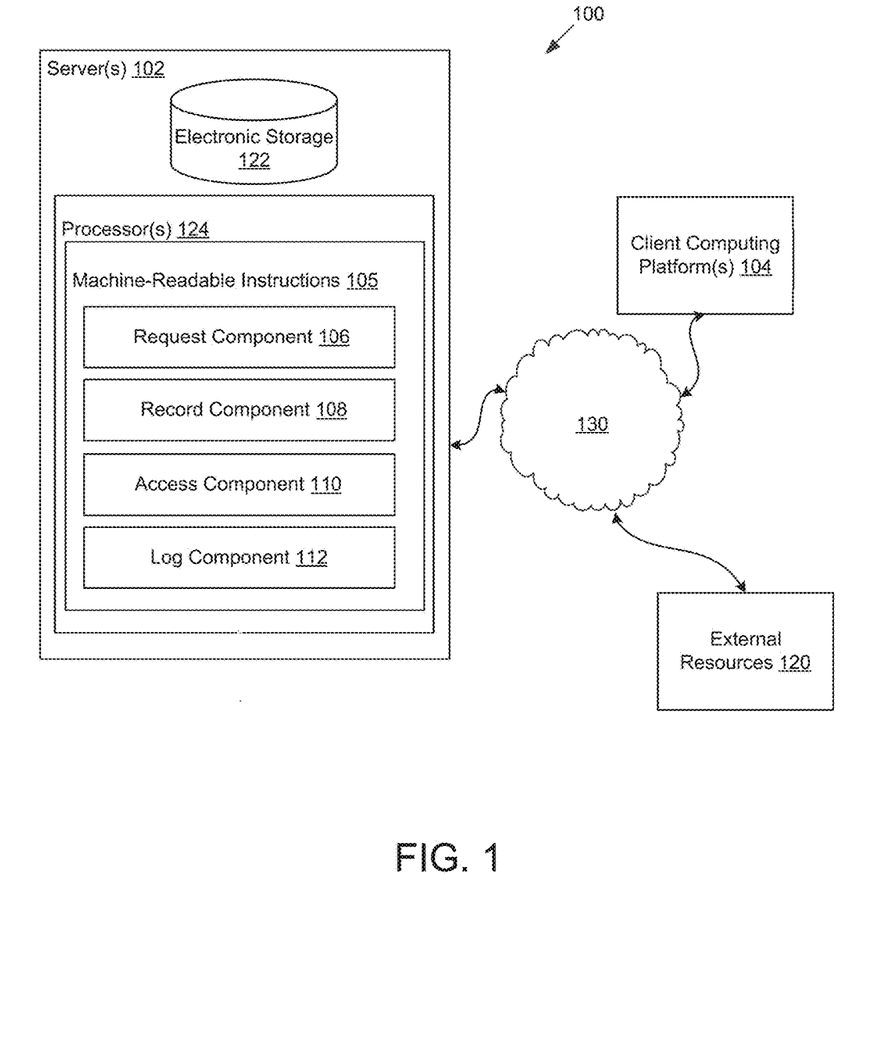
FIG. 1 illustrates an system for identifying whether users should be provided access to online content, in accordance with one or more implementations.

FIG. 1 illustrates an example system 100 for identifying whether users should be provided access to online content, in accordance with one or more implementations. System 100 may obtain request information related to user requests for content. The request information related to an individual request may include one or more of an account identifier of a requesting user account, a content identifier that identifies a piece of content being requested, temporal information indicating a time of the individual request, and/or other information. System 100 may maintain a record indicating whether or not requesting user accounts should be provided access to the online content. Responsive to obtaining request information related to user requests for content, system 100 may determine whether the requesting user accounts should be provided access to individual pieces of content requested based on the record. The record may include a dynamically updated record of one or more user accounts that should and/or should not be provided access to the online content. System 100 may update a log with the request information related to the user requests for content. As such, in some implementations, the log may include a log of the request information related to the user requests for content received by the system. System 100 may analyze the request information included in the log to identify one or more of the requesting user accounts that are currently provided access to the online content, but should not be provided access to the online content in the future. The record may be updated, based on an analysis of the request information included in the log, to indicate one or more user accounts should not be provided access to the online content. As such, in some implementations, future determinations of whether a requesting user account should be provided access to a piece of content may be determined based on the updated record.

In previously existing methods, content delivery networks (CDNs) generally do authentication and/or authorization for customers on the CDN server-side, but don't generally perform authorization and/or authentications for the content provider or host (e.g., via the content providers' servers). The present system describes technological improvements that may enable online content providers to proxy authenticate requests for their online content that is distributed through CDNs, without suffering from the drawbacks of DRM. Even with DRM in place, pirates may still be able to download and decrypt online content without permission because the encryption and the encrypted content may be decrypted on the client's computer. The users may then re-encode the content without DRM and share illegally. The system described herein enables and/or disallows initial access to the content based on the client's behavior. So, a pirate may not have access to the content to begin with.

As illustrated in FIG. 1, system 100 may include one or more server(s) 102, one or more client computing platform(s) 104, electronic storage 122, one or more external resources 120, one or more physical processor(s) 124 configured to execute machine-readable instructions 105, one or more computer program components 106-112, and/or other components.

One or more physical processor(s) 124 may be configured to execute machine-readable instructions. Executing machine-readable instructions 105 may cause the one or more physical processor(s) 124 to identify whether users should be provided access to online content. Machine-readable instructions 105 may include one or more computer program components such as a request component 106, a record component 108, an access component 110, a log component 112, and/or other components.

In some implementations, server(s) 102 may be configured to provide remote hosting of the features and/or functions of machine-readable instructions 105 to one or more client computing platform(s) 104 that may be remotely located from server(s) 102. Server(s) 102 may be associated with one or more CDNs, the online content provider, and/or other entities. As such, the arrangement of server(s) 102 and/or components 106-112 may vary and one or more server(s) 102 and/or components 106-112 may be associated with one or more systems (e.g., a CDN system, a content provider system, etc.).

In some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104. The client computing platform(s) 104 may include one or more of a laptop, a tablet computer, a desktop computer, a cellular telephone, a smartphone, a digital camera, a television set-top box, smart TV, a gaming console, and/or other platforms.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Users may submit user requests for online content via the internet (e.g., through a webpage, website, web platform, etc.). The requests for online content may be initiated by a user attempting to access and/or stream the online content. Request component 106 may be configured to obtain request information. The request information may be related to the user requests for content. The request information may be obtained from one or more client computing platform(s) 104 associated with one or more users. In some implementations, the requests for online content may be segmented into chunks such that individual requests are for an individual pieces of online content. Responsive to users submitting requests for pieces of content, request component 106 may obtain the request information associated with the individual requests for content. In some implementations, request component 106 may include, be included as part of, and/or be associated with a content delivery network (CDN). Access to the online content (e.g., distribution of the online content to the client computing platform(s) 104, etc.) may be provided via a CDN. System 100, the method described herein, the functionality attributed to system 100, and/or portions thereof may be performed with, or without a CDN.

The request information related to the user requests for content may indicate the source(s) of and/or user(s)/user account(s) associated with the requests, the content and/or pieces of content being requested, and/or other aspects of the requests. The request information related to an individual request may include one or more of an account identifier of a requesting user account, a content identifier that identifies a piece of content being requested, temporal information indicating a time of the individual request, and/or other information related to the individual request. By way of non-limiting example, first request information related to a first user request for a first piece of content may be obtained. The first request information may include a first account identifier, a first content identifier that identifies the first piece of content, first temporal information indicating a first time of the first user request, and or other information related to the first user request.

In some implementations, the user requests for content may be requests for individual chunks of a given online content item. For example, the user requests may be requests for individual pieces of online video content. The individual pieces of online video content may include video segments. By way of non-limiting example, an individual request may include a request for a 10-second segment of a video.

In some implementations, for example, the online content may be associated with online educational courses. As such, continuing the non-limiting example, the content identifiers may include information identifying one or more of a given course and/or lecture the piece of content the user is requesting is from, a given video or portion of the course and/or lecture the piece of content the user is requesting is from, which segment(s) of the video the user is requesting, and/or other information identifying the content requested.

Record component 108 may be configured to maintain a record indicating whether or not requesting user accounts should be provided access to the online content. By way of non-limiting example, maintaining the record may include storing the record, keeping the record, updating the record, providing access to the record, enabling queries and/or searches of the record, and/or otherwise maintaining the record. The record may include information identifying one or more of the requesting user accounts that should and/or should not be provided access to the online content. By way of non-limiting example, the record may include account identifiers for one or more of the requesting user accounts that should and/or should not be provided access to the online content. In some implementations, the record may include a list, database, of the requesting user accounts that should be provided access to the online content, a list of the requesting user accounts that should not be provided access to the online content, and/or other information indicating which user accounts should and/or should not be provided access to the online content. In some implementations, record component 108 may be included part of system 100 that is associated with and/or controlled by the content provider. In some implementations, record component 108 may be included in part of system 100 that is associated with and/or controlled by a CDN.

Access component 110 may be configured to determine whether the requesting user accounts should be provided access to individual pieces of content requested. Access component 110 may, in some implementations, authenticate the user requests for online content. The determination of whether the requesting user accounts should be provided access to the individual pieces of content requested may be based on the record. In some implementations, determining whether the requesting user accounts should be provided access to the individual pieces of content requested based on the record may include determining whether account identifiers for the requesting user accounts are and/or are not included the record. By way of non-limiting example, a determination that the first user account should be provided access to the first piece of content may be made based on the record. Continuing the non-limiting example, in some implementations, the determination that the first user account should be provided access to the first piece of content may be made based on a determination that the first account identifier is included in the record of users that should be provided access to the online content; and/or is not included in the record of users that should not be provided access to the online content.

Access component 110 may be configured to communicate with request component 106, record component 108, and/or other components to determine, responsive to obtaining user requests for online content, whether or not the requesting user accounts should be provided access to the individual pieces of content requested. In some implantations, responsive to access component 110 receiving an indication (e.g., from request component 106) that a given request for a given piece of content was obtained, whether or not the requesting user account should be provided access to the given piece of content is determined. In some implementations, access component 110 may be included part of system 100 that is associated with and/or controlled by the content provider. In some implementations, access component 110 may be included in part of system 100 that is associated with and/or controlled by a CDN.

Figure 2A:
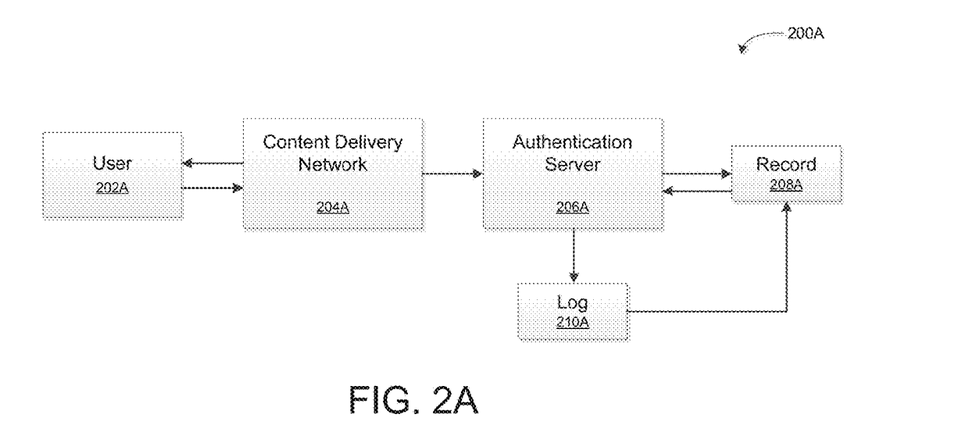
FIG. 2A illustrates a flowchart of a system for identifying whether users should be provided access to online content, in accordance with one or more implementations.
Figure 2B:
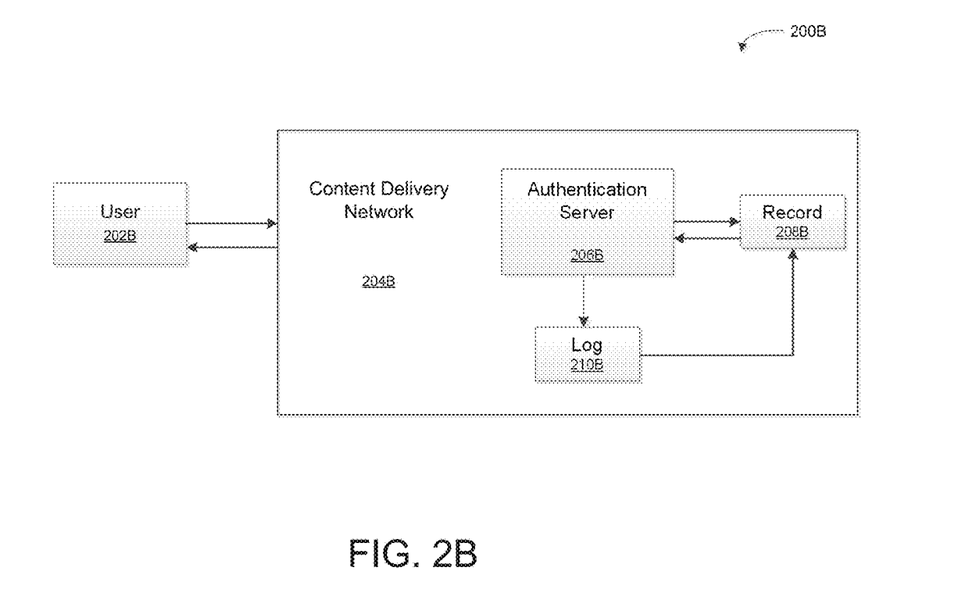
FIG. 2B illustrates a flowchart of a system for identifying whether users should be provided access to online content, in accordance with one or more implementations.

In some implementations, access component 110 may be part of a CDN and/or may be configured to communicate with a CDN to authenticate the user requests for the online content. By way of non-limiting example, access component 110 may be configured to communicate with a CDN such that the request information related to the user requests for content is provided to access component 110 from which to determine whether the requesting user accounts should be provided access to individual pieces of content requested. Continuing the non-limiting example, access component 110 may include and/or be included in an authentication server (see e.g., FIG. 2) that may receive the request information (e.g., a proxy authentication request, and/or other information) from which to determine whether the requesting user account should be provided access to the individual piece of content requested.

Access component 110 may be configured to approve and/or deny the user requests for content. Responsive to a determination that the requesting user accounts should be provided access to the individual pieces of content being requested, access component 110 may be configured to approve the user requests for content. By way of non-limiting example, responsive to a determination that the first account should be provided access to the first piece of content requested based on the record, the first user request is approved. Responsive to a determination that the requesting user accounts should not be provided access to the individual pieces of content requested, access component 110 may be configured to deny the user requests for content. By way of non-limiting example, the second user request for the second piece of content may be denied based on the updated record.

Access component 110 may be configured to provide access to the individual pieces of content requested responsive to approving one or more of the user request(s) for content. Providing access to the individual pieces of content requested may include delivering the individual pieces of content requested via a CDN, and/or transmitting approval for access to the individual pieces of content requested to the CDN, and/or otherwise delivering the individual pieces of content requested. For example, providing access to the individual pieces of content requested may include transmitting (e.g., streaming, and/or otherwise transmitting) data (e.g., a video file) including the individual pieces of content requested to the client computing platforms associated with the requesting user accounts. Access to the first piece of content may be provided to the first user account responsive to the first user request being approved. Access to the second piece of content may not be provided to the first user account responsive to the second user request being denied.

Log component 112 may be configured to update a log with the request information related to the user requests for content. The log may be updated responsive to request component 106 obtaining request information related to the user requests for content. In some implementations, the log is updated to include request information associated with the individual ones of the requests for content obtained such that the log includes a record or account of all of the requests for content obtained by request component 106 for a given period of time. For the individual ones of the requests for content obtained, log component 112 may update the log to include the account identifier of the requesting user account, the content identifier that identifies the piece of content being requested, temporal information indicating the time of the individual request, and/or other request information related to the individual ones of the requests for content. By way of non-limiting example, the log may be updated to include the first request information related to the first user request for the first piece of content.

Log component 112 may be configured to analyze the request information included in the log. The request information included in the log may be analyzed to identify one or more of the requesting user accounts that are currently provided access to the online content but should not be provided access to the online content in the future. By way of non-limiting example, the log may be analyzed to identify unauthorized and/or anomalous use associated with the online content. In some implementations, log component 112 may be included part of system 100 that is associated with and/or controlled by the content provider. In some implementations, log component 112 may be included in part of system 100 that is associated with and/or controlled by a CDN.

Log component 112 may analyze the request information according to individual ones of the requesting users. In some implementations, the request information may be analyzed on a per user basis. As such, analyzing the request information included in the log may include analyzing the request information that is related to the user requests for content made by individual ones of the requesting users to identify one or more individual ones of the requesting users that are currently provided access to the online content (e.g., based on the record) but should not be provided access to the online content in the future. By way of non-limiting example, the request information in the log related to the user requests for content made by the first user account may be analyzed.

Log component 112 may be configured to analyzing the request information dynamically and/or according to time intervals. As such, in some implementations, the request information may be analyzed and/or organized on a per-user, per-time interval basis. By way of non-limiting example, the request information included in the log may be analyzed per individual user account, per minute. Log component 112 may be configured to analyze the request information according to individual ones of the requesting user accounts and/or according to time intervals to identify one or more users that should not be provided access to the online content in the future. By way of non-limiting example, identifying the one or more user accounts that should not be provided access to the online content in the future may include identifying unauthorized use and/or anomalies in the request information included in the log. Unauthorized use and/or anomalies may be identified in the request information included in the log based on one or more factors. For example, the one or more factors may include the quantity of requests, a rate of requests, the type of requests, the individual pieces of content requested (e.g., for an online course, which video or lecture the individual pieces of content are part of), and/or other factors. Dynamically analyzing the request information included in the log may enable log component 112 to identify anomalies which may be associated with one or more users accounts.

By way of non-limiting example, anomalous use may be derived from users' access behavior (e.g., indicated by the request information associated with a given user account). The users' access behavior may include a pattern of requests for individual pieces of content made in a predefined timeframe (e.g., time interval) and/or for pieces of a distinct video and/or course. If a client's (e.g., user and/or user account) request pattern surpasses a threshold for normal video consumption, system 100 may indicate future requests from this client as anomalous and/or deny the future requests.

In some implementations, the request information related to the user requests for content received from individual ones of the requesting users accounts may be analyzed for individual ones of the time intervals. By way of non-limiting example, analyzing the request information included in the log may include organizing the request information into data structures for individual ones of the users. The request information included in the log may be organized according to individual time intervals to identify one or more differences, changes, and/or anomalies from one time interval to another and/or between an interval and an established pattern and/or expectation (e.g., determined based on the analysis of the request information for one or more previous time intervals for the same user and/or different user(s)). By way of non-limiting example, a given user attempting to access video chunks (e.g. individual pieces of content) of five different lectures within a one minute window (e.g., a time interval), or attempting to access multiple video chunks (e.g., all or above a threshold number of video chunks) in the same lecture within a one minute window, may be categorized as anomalous and/or unauthorized use. As such, log component 112 may identify the given user as a user that should not be provided access to the online content in the future and/or deny requests for individual pieces of content from a user account associated with the given user.

By way of non-limiting example, the request information included in the log related to the user requests for content made by the first user account may be analyzed according to the time intervals. As such, responsive to the first time for the first user request being within a first interval of time, the request information in the log related to the user requests for content made by the first user account during the first interval of time, as indicated by the temporal information, may be analyzed.

Log component 112 may be configured to identify one or more of the requesting user accounts that should not be provided access to the online content in the future based on the analysis of the request information in the log. By way of non-limiting examples, user accounts associated with anomalies within the request information may be identified as requesting user accounts that should not be provided access to the online content. In some implementations, the first user account may be identified as one of the requesting user accounts that should not be provided access to the online content in the future.

Returning to record component 108, log component 112 may communicate with record component 108 to provide information for updating the record based on an analysis of the request information included in the log. Record component 108 may be configured to update the record to indicate one or more user accounts should and/or should not be provided access to the online content. The record may be updated based on the analysis of the request information. By way of non-limiting example, record component 108 may be configured to update the record to indicate the first user account should not be provided access to the online content based on the analysis of the request information.

In some implementations, updating the record may include recording account identifiers for the one or more of the requesting user accounts identified that are currently provided access to the online content but should not be provided access to the online content in the future, and/or recording account identifiers for one or more of the requesting user accounts identified that should be provided access to the online content in the future. By way of non-limiting example, recording account identifiers may include deleting, adding, modifying, associated indications with, and/or changing indications associated with, one or more account identifiers included in the record.

Record component 108 may update the record such that a first account identifier is added to the record and/or removed from the record, based on the analysis of the request information related to the user requests for content made by the first user account.

Request component 106 may be configured to obtain second request information related to a second user request for a second piece of content made by the first user account. By way of non-limiting example, the second request may be a request initiated by the same user (e.g., the first user) as the first request for another segment of the video content (e.g., a different segment from the same video, the same segment from the same video, a segment from a different video, and/or another piece of online content). The second request information may include one or more of a first account identifier, a second content identifier that identifies the second piece of content, second temporal information indicating a second time of the second user request, and/or other information related to the second request for online content.

Responsive to receiving the second user request as request component 106, access component 110 may be configured to determine whether the first user account should be provided access to the second piece of content. Access component 110 may determine whether the first user account should be provided access to the second piece of content based on the record (e.g., determined via communicating with record component 108).

In some implementations, a determination that the first user account should not be provided access to the second piece of content being requested may be made. The determination that the first user account should not be provided access to the second piece of content may be based on the record (e.g., the updated record). By way of non-limiting example, the determination that the first user account should not be provided access to the second piece of content may be made based on a determination that the first account identifier is included and/or not included in the record as updated.

FIG. 2A illustrates a flowchart 200A of a system for identifying whether users should be provided access to online content, in accordance with one or more implementations. User 202A may submit one or more requests for individual pieces of online content to Content Delivery Network 204A. By way of non-limiting example, User 202A may submit the one or more requests for the individual pieces of online content via a webpage accessed via a client computing platform. Content Delivery Network may transmit authentication requests (e.g., proxy authentication requests, etc.) to Authentication Server 206A. The authentication requests may include the request information obtained by Content Delivery Network 204A. Authentication Server 206A may communicate with record 208A to determine whether the requesting user accounts should be provided access to the individual pieces of content requested based on record 208A.

Authentication Server 206 may update log 210A with the request information. Log 210A may be analyzed to identify one or more of the requesting user accounts that are currently provided access to the online content but should not be provided access to the online content in the future. Log 210A may communicate with record 208A to update record 208A based on an analysis of log 210A. Record 208A may be updated to indicate one or more of the requesting user accounts that should and/or should not be provided access to the online content. Responsive to the requests for the individual pieces of online content being approved by Authentication Server 206A, Content Delivery Network may provide User 202A with access to the online content requested. The system (e.g., the same as or similar to system 100) may repeat the process for the individual pieces of content requested by User 202A. One or more of Content Delivery Network 204A, Authentication Server 206A, Record 208A, and/or Log 210A may include and/or perform the functionality of one or more of components 106-112 (as illustrated in FIG. 1).

FIG. 2B illustrates a flowchart 200B of a system for identifying whether users should be provided access to online content, in accordance with one or more implementations. User 202B may submit one or more requests for individual pieces of online content to Content Delivery Network 204B. By way of non-limiting example, User 202B may submit the one or more requests for the individual pieces of online content via a webpage accessed via a client computing platform. Content Delivery Network may include Authentication Server 206B. The authentication requests may include the request information obtained by Content Delivery Network 204B. Authentication Server 206B may communicate with record 208B to determine whether the requesting user accounts should be provided access to the individual pieces of content requested based on record 208B.

Authentication Server 206 may update log 210B with the request information. Log 210B may be analyzed to identify one or more of the requesting user accounts that are currently provided access to the online content but should not be provided access to the online content in the future. Log 210B may communicate with record 208B to update record 208B based on an analysis of log 210B. Record 208B may be updated to indicate one or more of the requesting user accounts that should and/or should not be provided access to the online content. Responsive to the requests for the individual pieces of online content being approved by Authentication Server 206B, Content Delivery Network may provide User 202B with access to the online content requested. The system (e.g., the same as or similar to system 100) may repeat the process for the individual pieces of content requested by User 202B. One or more of Content Delivery Network 204B, Authentication Server 206B, Record 208B, and/or Log 210B may include and/or perform the functionality of one or more of components 106-112 (as illustrated in FIG. 1).

Returning to FIG. 1, the server(s) 102, client computing platforms 104, and/or external resources 120 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 120 may be operatively linked via some other communication media.

The external resources 120 may include sources of information, hosts and/or providers of products outside of system 100, external entities participating with system 100, external entities for products and/or product platforms, and/or other resources. In some implementations, some or all of the functionality attributed herein to external resources 120 may be provided by resources included in system 100.

The server(s) 102 may include electronic storage 122, one or more processor(s) 124, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102. Server(s) 102 may include and/or be part of one or more of a Content Delivery Network (CDN), an authentication server, and/or other servers.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 are configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 124 may be configured to execute components 106-112. Processor 124 may be configured to execute components 106, 108, 110, and/or 112, by software; hardware; firmware; some combination of software, hardware, and/or firmware; and/or other mechanisms for configuring processing capabilities on processor 124. Processor 124 may include a combination of processors, APIs, third party services, networks, and/or machine-readable instructions.

It should be appreciated that although components 106-112 are illustrated in FIG. 1 as being located and/or co-located within a particular component of system 100, in implementations in which physical processor(s) 124 include multiple processing units, one or more of components 106-112 may be located remotely from the other components. The description of the functionality provided by the different components 106-112 described herein is for illustrative purposes, and is not intended to be limiting, as any of components 106-112 may provide more or less functionality than is described. For example, one or more of components 106-112 may be eliminated, and some or all of its functionality may be incorporated, shared, integrated into, and/or otherwise provided by other ones of components 106-112. Note that physical processor(s) 124 may be configured to execute one or more additional components that may perform some or all of the functionality attributed herein to one of components 106-112.

One or more of the components of system 100 may be configured to present and/or provide an administrator interface between system 100 and a user through which the administrator can provide information to and receive information from system 100. This enables data, results, and/or instructions (e.g., determinations, selections, and/or other indications) and any other communicable items, collectively referred to as "information," to be communicated between the administrator and system 100. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 3:
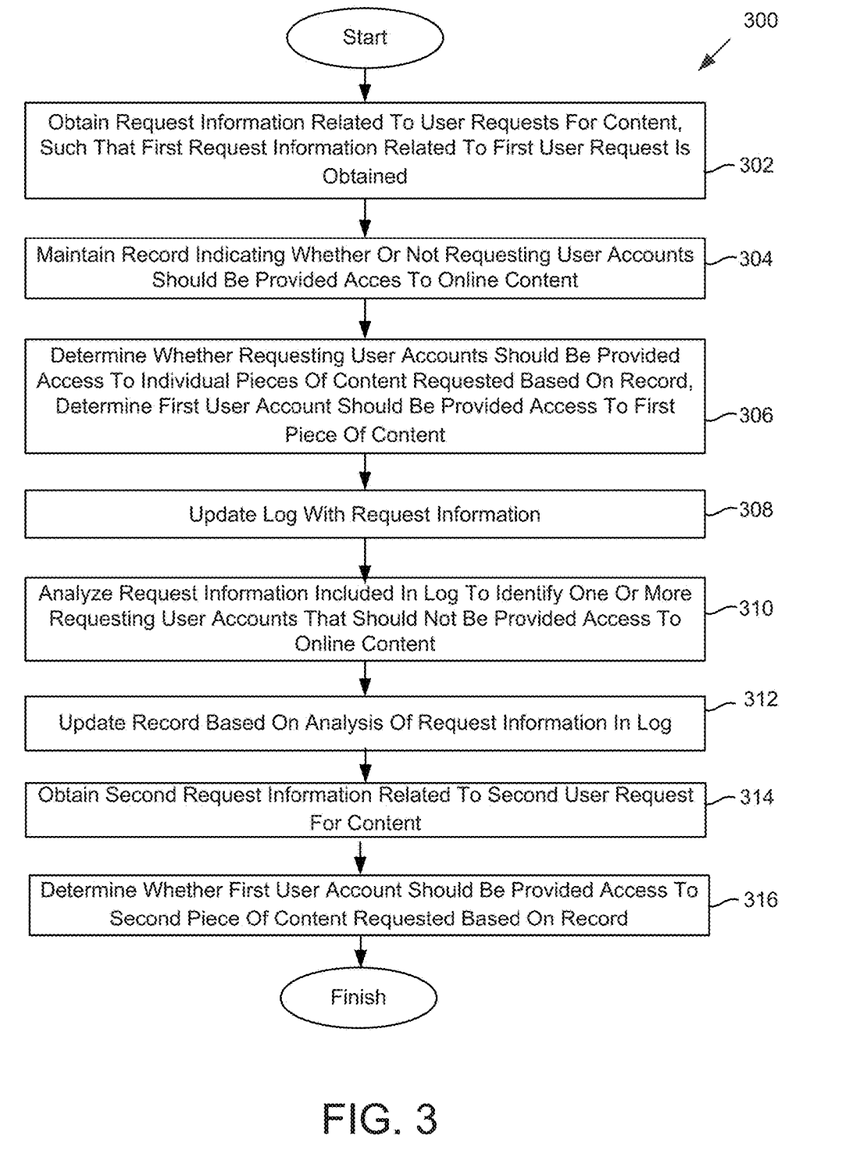
FIG. 3 illustrates a method for identifying whether users should be provided access to online content, in accordance with one or more implementations.

FIG. 3 illustrates an exemplary method 300 for identifying whether users should be provided access to online content, in accordance with one or more implementations. The operations of method 300 presented below are intended to be illustrative and non-limiting examples. In certain implementations, method 300 may be accomplished with one or more additional operations not described, and/or without one or more of the operations discussed. Additionally, the order in which the operations of method 300 are illustrated in FIG. 3 and described below is not intended to be limiting.

In certain implementations, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Regarding method 300, at an operation 302, request information related to user requests for content may be obtained. The request information related to an individual request may include one or more of an account identifier of a requesting user account, a content identifier that identifies a piece of content being requested, temporal information indicating a time of the individual request and/or other information. First request information related to a first user request for a first piece of content may be obtained. The first request information may include one or more of a first account identifier, a first content identifier that identifies the first piece of content, first temporal information indicating a first time of the first user request, and/or other information. In some implementations, operation 302 is performed by a request component the same as or similar to request component 106 (shown in FIG. 1 and described herein).

At an operation 304, a record may be maintained. The record may indicate whether or not requesting user accounts should be provided access to the online content. In some implementations, operation 304 is performed by a record component the same as or similar to record component 108 (shown in FIG. 1 and described herein).

At an operation 306, whether the requesting user accounts should be provided access to individual pieces of content requested may be determined. Whether the requesting user accounts should be provided access to individual pieces of content requested may be determined based on the record. A determination that the first user account should be provided access to the first piece of content may be made based on the record. In some implementations, operation 306 is performed by an access component the same as or similar to access component 110 (shown in FIG. 1 and described herein).

At an operation 308, a log may be updated. The log may be updated with the request information related to the user requests for content. The log may be updated to include the first request information related to the first user request for the first piece of content. In some implementations, operation 308 is performed by a log component the same as or similar to log component 112 (shown in FIG. 1 and described herein).

At an operation 310, the request information included in the log may be analyzed. The request information may be analyzed to identify one or more of the requesting user accounts that are currently provided access to the online content, but should not be provided access to the online content in the future. The request information may be analyzed according to individual ones of the requesting users. As such, analyzing the request information included in the log may include analyzing the request information that is related to the user requests for content made by individual ones of the requesting users. The request information in the log related to the user requests for content made by the first user account may be analyzed. The first user account may be identified as one of the requesting user accounts that should not be provided access to the online content in the future. In some implementations, operation 310 is performed by a log component the same as or similar to log component 112 (shown in FIG. 1 and described herein).

At an operation 312, the record may be updated. The record may be updated based on analysis of the request information included in the log. In some implementations, the record may be updated to indicate the first user account should not be provided access to the online content. In some implementations, operation 312 is performed by a record component the same as or similar to record component 108 (shown in FIG. 1 and described herein).

At an operation 314, request information related to user requests for content may be obtained. For example, second request information related to a second user request for a second piece of content made by the first user account may be obtained. The second request information may include one or more of the first account identifier, a second content identifier that identifies the second piece of content, second temporal information indicating a second time of the second user request, and/or other information. In some implementations, operation 314 is performed by a request component the same as or similar to request component 106 (shown in FIG. 1 and described herein).

At an operation 316, whether the requesting user accounts should be provided access to individual pieces of content requested may be determined. For example, whether the first user account should be provided access to the second piece of content may be determined. Whether the first user account should be provided access to the second piece of content may be determined based on the record. A determination that the first user account should not be provided access to the second piece of content being requested may be made based on the record. In some implementations, operation 316 is performed by an access component the same as or similar to access component 110 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for identifying whether users should be provided access to online content, the system comprising:
one or more processors configured by machine-readable instructions to:
obtain request information related to user requests for content, the request information related to an individual request including an account identifier of a requesting user account, a content identifier that identifies a piece of content being requested, and temporal information indicating a time of the individual request, such that first request information related to a first user request for a first piece of content is obtained and includes a first account identifier, a first content identifier that identifies the first piece of content, and first temporal information indicating a first time of the first user request;
maintain a record indicating whether or not requesting user accounts should be provided access to the online content;
determine whether the requesting user accounts should be provided access to individual pieces of content requested based on the record, such that a determination that the first user account should be provided access to the first piece of content is made based on the record;
update a log with the request information related to the user requests for content, such that the log is updated to include the first request information related to the first user request for the first piece of content;
analyze the request information included in the log to identify one or more of the requesting user accounts that are currently provided access to the online content but should not be provided access to the online content in the future, the request information being analyzed according to individual ones of the requesting users such that analyzing the request information included in the log includes analyzing the request information that is related to the user requests for content made by individual ones of the requesting users, wherein the request information in the log related to the user requests for content made by the first user account is analyzed and the first user account is identified as one of the requesting user accounts that should not be provided access to the online content in the future, and includes analyzing the request information according to time intervals, wherein that the request information related to user requests for content received from individual ones of the requesting users accounts are analyzed for individual ones of the time intervals, wherein the request information included in the log related to the user requests for content made by the first user account is analyzed according to the time intervals, such that responsive to the first time for the first user request being within a first interval of time, the request information in the log related to the user requests for content made by the first user account during the first interval of time, as indicated by the temporal information, are analyzed;

update the record, based on analysis of the request information included in the log, to indicate the first user account should not be provided access to the online content;

obtain second request information related to a second user request for a second piece of content made by the first user account, the second request information including the first account identifier, a second content identifier that identifies the second piece of content, and second temporal information indicating a second time of the second user request; and determine whether the first user account should be provided access to the second piece of content based on the record, wherein a determination that the first user account should not be provided access to the second piece of content being requested is made based on the record.

2. The system of claim 1, wherein the user requests for content are requests for individual pieces of online video content, the individual pieces being video segments.

3. The system of claim 1, wherein the record includes one or more of the requesting user accounts that should and/or should not be provided access to the online content.

4. The system of claim 3, wherein the record includes account identifiers for the one or more of the requesting user accounts that should and/or should not be provided access to the online content.

5. The system of claim 3, wherein the one or more processors are configured by machine-readable instructions such that determining whether requesting user accounts should be provided access to the pieces of content requested includes:

determining whether account identifiers for the requesting user accounts are and/or are not included the record, wherein the determination that the first user account should be provided access to the first piece of content is made based on a determination that the first account identifier is and/or is not included in the record, and the determination that the first user account should not be provided access to the second piece of content is made based on a determination that the first account identifier is included and/or not included in the record as updated.

6. The system of claim 1, wherein the one or more processors are configured by machine-readable instructions such that, responsive to a determination that the requesting user accounts should be provided access to the individual pieces of content being requested, the user requests for content are approved, and wherein the first user request for the first piece of content is approved.

7. The system of claim 6, wherein the one or more processors are configured by machine-readable instructions such that approving the user requests for content includes providing the requesting user accounts access to the individual pieces of content requested, such that access to the first piece of content is provided to the first user account responsive to the first user request being approved.

8. The system of claim 1, wherein the one or more processors are configured by machine-readable instructions such that, responsive to a determination that the requesting user accounts should not be provided access to the individual pieces of content requested, the user requests for content are denied, and wherein the second user request for the second piece of content is denied.

9. The system of claim 8, wherein the one or more processors are configured by machine-readable instructions such that denying the user requests for content includes not providing the requesting user accounts access to the individual pieces of content requested, such that the first user account is not provided access to the second piece of content responsive to the second user request being denied.

10. The system of claim 1, wherein the one or more processors are configured by machine-readable instructions such that updating the record based on the analysis of the request information includes:

recording account identifiers for the one or more of the requesting user accounts identified that are currently provided access to the online content but should not be provided access to the online content in the future, such that a first account identifier is added to the record or removed from the record based on the analysis of the request information related to the user requests for content made by the first user account.

11. A method for identifying whether users should be provided access to online content, the method being implemented by a computer system including one or more processors configured by machine-readable instructions, the method comprising:

obtaining request information related to user requests for content, the request information related to an individual request including an account identifier of a requesting user account, a content identifier that identifies a piece of content being requested, and temporal information indicating a time of the individual request, such that first request information related to a first user request for a first piece of content is obtained and includes a first account identifier, a first content identifier that identifies the first piece of content, and first temporal information indicating a first time of the first user request;

maintaining a record indicating whether or not requesting user accounts should be provided access to the online content;

determining whether the requesting user accounts should be provided access to individual pieces of content requested based on the record, such that a determination that the first user account should be provided access to the first piece of content is made based on the record;

updating a log with the request information related to the user requests for content, such that the log is updated to include the first request information related to the first user request for the first piece of content;

analyzing the request information included in the log to identify one or more of the requesting user accounts that are currently provided access to the online content but should not be provided access to the online content in the future, the request information being analyzed according to individual ones of the requesting users such that analyzing the request information included in the log includes analyzing the request information that is related to the user requests for content made by individual ones of the requesting users, wherein the request information in the log related to the user requests for content made by the first user account is analyzed and the first user account is identified as one of the requesting user accounts that should not be provided access to the online content in the future, and includes analyzing the request information according to time intervals, wherein that the request information related to user requests for content received from individual ones of the requesting users accounts are analyzed for individual ones of the time intervals, wherein the request information included in the log related to the user requests for content made by the first user account is analyzed according to the time intervals, such that responsive to the first time for the first user request being within a first interval of time, the request information in the log related to the user requests for content made by the first user account during the first interval of time, as indicated by the temporal information, are analyzed;

updating the record, based on analysis of the request information included in the log, to indicate the first user account should not be provided access to the online content;

obtaining second request information related to a second user request for a second piece of content made by the first user account, the second request information including the first account identifier, a second content identifier that identifies the second piece of content, and second temporal information indicating a second time of the second user request; and determining whether the first user account should be provided access to the second piece of content based on the record, wherein a determination that the first user account should not be provided access to the second piece of content being requested is made based on the record.

12. The method of claim 11, wherein the user requests for content are requests for individual pieces of online video content, the individual pieces being video segments.

13. The method of claim 11, wherein the record includes one or more of the requesting user accounts that should and/or should not be provided access to the online content.

14. The method of claim 13, wherein the record includes account identifiers for the one or more of the requesting user accounts that should and/or should not be provided access to the online content.

15. The method of claim 13, wherein determining whether requesting user accounts should be provided access to the pieces of content requested includes:

determining whether account identifiers for the requesting user accounts are and/or are not included the record, wherein the determination that the first user account should be provided access to the first piece of content is made based on a determination that the first account identifier is and/or is not included in the record, and the determination that the first user account should not be provided access to the second piece of content is made based on a determination that the first account identifier is included and/or not included in the record as updated.

16. The method of claim 11, wherein, responsive to a determination that the requesting user accounts should be provided access to the individual pieces of content being requested, the user requests for content are approved, and the first user request for the first piece of content is approved.

17. The method of claim 16, wherein approving the user requests for content includes providing the requesting user accounts access to the individual pieces of content requested, such that access to the first piece of content is provided to the first user account responsive to the first user request being approved.

18. The method of claim 11, wherein, responsive to a determination that the requesting user accounts should not be provided access to the individual pieces of content requested, the user requests for content are denied, and the second user request for the second piece of content is denied.

19. The method of claim 18, wherein denying the user requests for content includes not providing the requesting user accounts access to the individual pieces of content requested, such that the first user account is not provided access to the second piece of content responsive to the second user request being denied.

20. The method of claim 11, wherein updating the record based on the analysis of the request information includes:

recording account identifiers for the one or more of the requesting user accounts identified that are currently provided access to the online content but should not be provided access to the online content in the future, such that a first account identifier is added to the record or removed from the record based on the analysis of the request information related to the user requests for content made by the first user account.

21. A non-transitory machine-readable storage medium comprising machine readable instructions for causing a processor to execute a method for identifying whether users should be provided access to online content, comprising:

obtaining request information related to user requests for content, the request information related to an individual request including an account identifier of a requesting user account, a content identifier that identifies a piece of content being requested, and temporal information indicating a time of the individual request, such that first request information related to a first user request for a first piece of content is obtained and includes a first account identifier, a first content identifier that identifies the first piece of content, and first temporal information indicating a first time of the first user request;

maintaining a record indicating whether or not requesting user accounts should be provided access to the online content;

determining whether the requesting user accounts should be provided access to individual pieces of content requested based on the record, such that a determination that the first user account should be provided access to the first piece of content is made based on the record;

updating a log with the request information related to the user requests for content, such that the log is updated to include the first request information related to the first user request for the first piece of content;

analyzing the request information included in the log to identify one or more of the requesting user accounts that are currently provided access to the online content but should not be provided access to the online content in the future, the request information being analyzed according to individual ones of the requesting users such that analyzing the request information included in the log includes analyzing the request information that is related to the user requests for content made by individual ones of the requesting users, wherein the request information in the log related to the user requests for content made by the first user account is analyzed and the first user account is identified as one of the requesting user accounts that should not be provided access to the online content in the future, and includes analyzing the request information according to time intervals, wherein that the request information related to user requests for content received from individual ones of the requesting users accounts are analyzed for individual ones of the time intervals, wherein the request information included in the log related to the user requests for content made by the first user account is analyzed according to the time intervals, such that responsive to the first time for the first user request being within a first interval of time, the request information in the log related to the user requests for content made by the first user account during the first interval of time, as indicated by the temporal information, are analyzed;

updating the record, based on analysis of the request information included in the log, to indicate the first user account should not be provided access to the online content;

obtaining second request information related to a second user request for a second piece of content made by the first user account, the second request information including the first account identifier, a second content identifier that identifies the second piece of content, and second temporal information indicating a second time of the second user request; and determining whether the first user account should be provided access to the second piece of content based on the record, wherein a determination that the first user account should not be provided access to the second piece of content being requested is made based on the record.

* * * * *